United States Patent [19]

Bouchard

[11] Patent Number: 4,521,837
[45] Date of Patent: Jun. 4, 1985

[54] COMPACT FLUORESCENT LAMP HAVING INCREASED LIGHT OUTPUT

[75] Inventor: Andre C. Bouchard, Peabody, Mass.

[73] Assignee: GTE Products Corporation, Stamford, Conn.

[21] Appl. No.: 622,361

[22] Filed: Jun. 20, 1984

[51] Int. Cl.[3] .............................................. F21S 5/00
[52] U.S. Cl. .................................. 362/216; 362/217; 313/114; 313/493
[58] Field of Search ............... 362/216, 217; 313/113, 313/114, 485, 492, 493, 371

[56] References Cited

U.S. PATENT DOCUMENTS

| | | | |
|---|---|---|---|
| 2,769,112 | 10/1956 | Heine et al. | 313/491 X |
| 3,504,218 | 3/1970 | Emidy et al. | 313/492 X |
| 3,987,331 | 10/1976 | Schreurs | 313/493 X |
| 3,995,192 | 11/1976 | Hammer | 313/486 X |
| 4,020,378 | 4/1977 | Morehead | 313/490 |
| 4,119,889 | 10/1978 | Hollister | 313/493 X |
| 4,208,604 | 6/1980 | Couwenberg | 313/216 X |
| 4,300,073 | 11/1981 | Skwirut et al. | 313/493 X |
| 4,344,016 | 8/1982 | Hoffmann et al. | 313/493 X |
| 4,422,010 | 12/1983 | Hammer | 313/216 X |
| 4,454,447 | 6/1984 | Roche et al. | 313/492 |

Primary Examiner—Peter A. Nelson
Attorney, Agent, or Firm—Carlo S. Bessone; William H. McNeill

[57] ABSTRACT

Light output of compact fluorescent lamps is increased by providing metal base members within the lamp with a diffuse light reflecting coating such as, e.g., zirconium dioxide.

3 Claims, 1 Drawing Figure

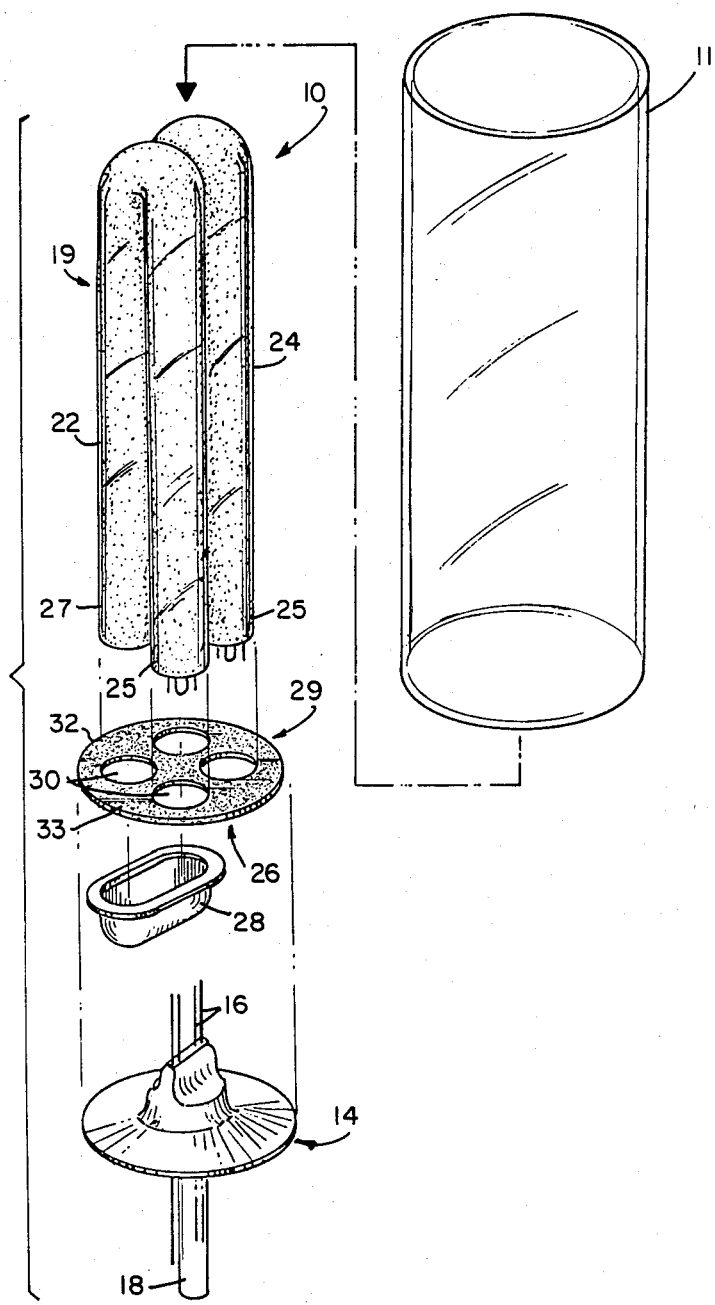

COMPACT FLUORESCENT LAMP HAVING INCREASED LIGHT OUTPUT

TECHNICAL FIELD

This invention relates to fluorescent lamps and more particularly to compact versions of such lamps having utility as replacements for incandescent lamps.

BACKGROUND ART

The fluorescent lamp is the most widely utilized light source in the world for general illumination, primarily because of its relatively low initial cost and its efficacy: i.e., its light output relative to its power input, usually expressed as lumens per watt (LPW). Nevertheless, for home use, the fluorescent lamp has not taken precedence over the incandescent lamp. Many reasons have been advanced for this lack of acceptance, among them the poor color rendition of some fluorescent lamps and their need for a ballast. However, one of the major disadvantages lies in the fact that a fluorescent lamp is a linear light source whereas an incandescent lamp can almost be considered a point source. The typical fluorescent lamp has a length of from 18" to 8' and is somewhat cumbersome to work with.

With the increasing cost of energy, attempts have been made to overcome the latter difficulty. One of these attempts has utilized a plurality of fluorescent tubes having one or more smaller tubes connecting the ends of the fluorescent tubes to provide an arc path. Such lamps are shown in U.S. Pat. No. 3,501,662. Large, "U" shaped lamps such as those shown in U.S. Pat. Nos. 3,602,755; and 2,401,228; and triple bend lamps such as shown in U.S. Pat. No. 4,347,460 exemplify other attempts.

Still other attempts are shown in U.S. Pat. Nos. 4,208,618; 4,191,907; and Ser. No. 481,230, filed Apr. 1, 1983 and assigned to the assignee of the instant invention.

While each of these proposals has its own advantages, disadvantages also exist. The previous forms of multiple tubing lamps are expensive to produce and difficult to handle during manufacture.

Many types require expensive, custom made partitions and/or require large numbers of hermetic seals. Multiple bend tubes require large outlays for manufacturing equipment which adds to the cost of the final lamp.

In some types the light output is low because of light scattering and absorption by assembly elements and mounting structures contained therein.

DISCLOSURE OF THE INVENTION

It is, therefore, an object of the invention to obviate the disadvantages of the prior art.

It is another object of the invention to provide a compact fluorescent lamp.

Yet another object of the invention is the provision of a compact fluorescent lamp that is economical to fabricate.

Still another object of the invention is the enhancement of light output from a compact fluorescent lamp.

These objects are accomplished, in one aspect of the invention, by a compact fluorescent lamp which comprises at least two U shaped tubes, coated on their interior surface with a phosphor, which are mounted upon a metal base member. The tubes and base member are mounted in an envelope. The upper surface of the base member, i.e., the surface facing the tubes, is provided with a light reflecting coating.

Such lamps have increased light output when compared to similar lamps without the reflecting coating.

BRIEF DESCRIPTION OF THE DRAWING

The single FIGURE is an exploded, perspective view of a lamp employing the invention.

BEST MODE FOR CARRYING OUT THE INVENTION

For a better understanding of the present invention, together with other and further objects, advantages, and capabilities thereof, reference is made to the following disclosure and appended claims taken in conjunction with the above-described drawings.

Referring now to the drawings with greater particularity, there is shown in FIG. 1 a compact fluorescent lamp 10 having an outer, light-transmissive, glass envelope 11 which is hermetically sealed to a flare 14 which includes lead-in wires 16 and an exhaust tubulation 18. An arc generating and sustaining medium, e.g., about 20 mg of mercury and argon at a pressure of 3 torr, is provided within envelope 14.

Positioned within envelope 11 is an assembly 19 comprised of two U shaped tubes 22 and 24 each coated on their interior surface with a suitable U.V. excitable phosphor, e.g., a calcium halo-phosphate activated by antimony and manganese.

One end, e.g., 25, of each tube is provided with an electrode and the other end, 27, remains open. The ends 25 and 27 are mounted upon an arc directing means 26 which comprises a metal base member 29 having apertures 30 therein to receive the ends 25 and 27. An arc director 28 is affixed to the underside of base member 29 and closes the open ends 27 to provide an arc path. The above-mentioned U.S. Ser. No. 481,230 contains further details of the operation of such lamps and the teachings thereof are incorporated herein by reference.

To increase the light output of lamp 10 the upper, or first planar surface 32 of the base member 29 is provided with a diffuse, light reflecting coating 33.

In a preferred embodiment of the invention the coating 33 is a layer of zirconium dioxide.

The base member 29, which is preferably nickel plated steel, can be coated by spraying with a suspension of zirconium dioxide powder in alcohol. After spraying, the coated base member is air dried and subsequently baked at 100° C. to remove any residual traces of alcohol; thereafter, lamp 10 is assembled in regular fashion.

Comparison of lamps fabricated with the coated base member with lamps made with uncoated base members showed surprising results. The lamps with the coated base members exhibited light output increases of from 3% to 6%; this increase coming with no increase in the size of the lamp or its power consumption.

The light improvement gains are attributed to less visible light absorption losses from the radiating phosphor in the tubes.

Additionally, gains are believed to be attributable to the infra-red and ultraviolet reflective properties of the coating lessening the temperature rise of the mercury cold spot.

Other materials having a high reflectance for the light emitted by the lamps can also be employed, so long as they are stable and inert with respect to the lamp environment.

While there have been shown and described what are at present considered to be the preferred embodiments of the invention, it will be apparent to those skilled in the art that various changes and modifications can be made herein without departing from the scope of the invention as defined by the appended claims.

I claim:

1. A fluorescent lamp comprising: an hermetically sealed outer envelope containing an arc generating and sustaining medium; an assembly positioned within said envelope, said assembly comprising a pair of U shaped tubes coated on their interior surface with a phosphor, each of said tubes having an electrode end carrying an electrode and an open end; and an arc directing means operatively associated with said ends of said tubes, said arc directing means comprising a base member mounting said tubes, said base member having a first planar surface facing said tubes and a second planar surface which includes an arc director connecting said open ends of said tubes; and a light reflecting coating on said first planar surface.

2. The fluorescent lamp of claim 1 wherein said light reflecting coating is white.

3. The fluorescent lamp of claim 2 wherein said light reflecting coating is comprised of zirconium dioxide.

* * * * *